US 12,239,499 B2

(12) United States Patent
Weiss et al.

(10) Patent No.: US 12,239,499 B2
(45) Date of Patent: Mar. 4, 2025

(54) METHOD OF MANUFACTURING A DENTAL RESTORATION

(71) Applicants: DENTSPLY SIRONA Inc., York, PA (US); SIRONA DENTAL SYSTEMS GMBH, Bensheim (DE)

(72) Inventors: Daniel Weiss, Heddesheim (DE); Oliver Nowarra, Leimen (DE); Peter Fornoff, Reichelsheim (DE)

(73) Assignee: Dentsply Sirona Inc., York, PA (US)

( * ) Notice: Subject to any disclaimer, the term of this patent is extended or adjusted under 35 U.S.C. 154(b) by 265 days.

(21) Appl. No.: 17/640,966

(22) PCT Filed: Sep. 21, 2020

(86) PCT No.: PCT/EP2020/076237
§ 371 (c)(1),
(2) Date: Mar. 7, 2022

(87) PCT Pub. No.: WO2021/058418
PCT Pub. Date: Apr. 1, 2021

(65) Prior Publication Data
US 2022/0338965 A1    Oct. 27, 2022

(30) Foreign Application Priority Data
Sep. 24, 2019  (EP) .................................. 19199319

(51) Int. Cl.
*A61C 13/00* (2006.01)
*A61C 9/00* (2006.01)
(52) U.S. Cl.
CPC ........ *A61C 13/0004* (2013.01); *A61C 9/0053* (2013.01)
(58) Field of Classification Search
CPC .............. A61C 13/0004; A61C 9/0053; A61C 13/0022; A61C 1/0007; A61C 9/0046;
(Continued)

(56) References Cited

U.S. PATENT DOCUMENTS 4,616,322 A * 10/1986 Niwa ................. G05B 19/4065
                                                    700/179
2002/0013639 A1 * 1/2002 Fujishima .......... G05B 19/4065
                                                    700/169
(Continued)

FOREIGN PATENT DOCUMENTS

JP      2000135228 A    5/2000
JP      2001079018 A    3/2001
(Continued)

OTHER PUBLICATIONS

International Search Report; PCT/EP2020/076237; Nov. 12, 2020 (completed); Nov. 20, 2020 (mailed).
(Continued)

*Primary Examiner* — Christopher E. Everett
(74) *Attorney, Agent, or Firm* — SCHWEGMAN LUNDBERG & WOESSNER, P.A.

(57) ABSTRACT

A method of manufacturing a dental restoration including a construction step (S2) of preparing construction data for a dental tool machine for machining the dental restoration from a workpiece. The construction data defines at least the geometry of the dental restoration within the workpiece. The method includes a starting step (S3) of starting machining of the dental restoration from the workpiece in accordance with the construction data. The method also includes a preparing step (S4) of starting preparing, before termination of the construction step (S2), the dental tool machine at least through equipping it with all the consumables essential for starting the starting step (S3), and completing preparing the dental tool machine before start of the starting step (S3).

13 Claims, 1 Drawing Sheet

(58) Field of Classification Search
CPC .................. A61C 19/04; A61B 5/0088; A61B 2018/20353
See application file for complete search history.

(56) References Cited

U.S. PATENT DOCUMENTS

| | | | |
|---|---|---|---|
| 2013/0209962 A1* | 8/2013 | Thompson | A61C 13/10 433/191 |
| 2016/0193708 A1* | 7/2016 | Yin | B23Q 17/0909 324/691 |
| 2016/0291585 A1 | 10/2016 | Leeson | |
| 2017/0156828 A1 | 6/2017 | Leeson | |
| 2021/0053169 A1* | 2/2021 | Benzinger | A61C 13/0004 |

FOREIGN PATENT DOCUMENTS

| | | |
|---|---|---|
| JP | 2002224142 A | 8/2002 |
| JP | 2003529386 A | 10/2003 |
| JP | 2011194119 A | 10/2011 |
| JP | 2016517308 A | 6/2016 |
| JP | 2016183460 A | 10/2016 |
| JP | 2017064190 A | 4/2017 |
| WO | 2018232234 A1 | 12/2018 |

OTHER PUBLICATIONS

International Preliminary Report on Patentability; PCT/EP2020/076237; Nov. 12, 2020 (completed); Nov. 20, 2020 (mailed).
Written Opinion of the International Searching Authority; PCT/EP2020/076237; Nov. 12, 2020 (completed); Nov. 20, 2020 (mailed).
Japanese Office Action dated May 7, 2024.

\* cited by examiner

METHOD OF MANUFACTURING A DENTAL RESTORATION

CROSS-REFERENCE TO RELATED APPLICATIONS

This is a National Phase application of International Application No. PCT/EP2020/076237, filed Sep. 21, 2020, which claims the benefit of and priority to European Application Ser. No. 19199319.5, filed on Sep. 24, 2019, which are herein incorporated by reference for all purposes.

TECHNICAL FIELD OF THE INVENTION

The present invention relates to a dental manufacturing system for manufacturing a dental restoration. The present invention particularly relates to a method of manufacturing a dental restoration.

BACKGROUND OF THE INVENTION

In the prior art, a dental restoration is typically manufactured by using a dental manufacturing system which includes an intraoral scanner for intraorally scanning the patient, a dental tool machine for machining the dental restoration from a workpiece, and a CAD/CAM software running on a PC which is connected to the intraoral scanner and the dental tool machine. The CAD/CAM software utilizes the scanning data generated by the intraoral scanner to prepare the construction data for the dental tool machine for machining the dental restoration from the workpiece. The construction data defines the geometry of the dental restoration within the workpiece.

FIG. 1a illustrates a workflow of manufacturing a dental restoration according to the prior art. As shown in FIG. 1a, the workflow includes a scanning step (S1') in which the intraoral scanning of a patient is performed by using an intraoral scanner connected to the PC. The workflow further includes a construction step (S2') in which construction data is prepared through a CAD/CAM software in the PC for the dental tool machine for machining the dental restoration from the workpiece. With the foregoing steps, the design of the dental restoration and its position in the workpiece is completely determined for the machining. Thereafter, as shown in the workflow of FIG. 1a, in a starting step (S3'), the machining of the dental restoration from the workpiece is started through the PC in accordance with the construction data. Thereafter, the operator is prompted through the PC in a preparing step (S4') to equip the dental tool machine with the essential consumables such as one or more dental tools for milling and grinding, the workpiece, and the cooling lubricant which is typically provided in an exchangeable tank. If necessary, during the preparing step (S4'), the dental tools are replaced by the operator with new ones and the tank is exchanged by the user with a tank storing fresh lubricant. As shown in FIG. 1a, during the preparing step (S4'), the dental tool machine measures the workpiece and dental tools through touching operations for performing the calibration. After the calibration, the dental restoration is machined, i.e., milled and grinded until the process of machining is completed. During the machining, the cooling lubricant is sprayed, in a closed circulation loop, onto the workpiece and the dental tool.

All the above-mentioned steps can be performed in the practice of a dentist during the presence of the patient. Therefore, the overall time spend for manufacturing the dental restoration is a critical factor. The long waiting periods are uncomfortable for the patient and increase the manufacturing costs.

Apart from the critical factors such as the production time & cost, the quality of the dental restoration is also crucial. The workpieces and the dental tools available on the market vary in size, shape, and material. In the preparing step (S4'), the dental tool machine must be equipped by the operator with the correct workpiece, the adequate dental tool, and the correct cooling lubricant. If the cooling lubricant has insufficient remaining service life or if the dental tool does not specifically match the specific requirements of the machining, then there is a risk that the dental restoration cannot be machined with the desired quality. In the worst case, the dental tool may be overrun its total service life or its remaining service life if it has been previously used in a preceding machining process. In such events, the dental tool will break, and the dental restoration will receive damages. In less severe cases, the machining of the dental restoration is completed with an unacceptable, low quality due to the use of the inadequate dental tool or insufficient lubrication. In all these cases, the user satisfaction may decrease, and the users may complain about the quality.

SUMMARY

An objective of the present invention is to overcome the problems of the prior art as much as possible and to provide a method of manufacturing a dental restoration which reduces the production time and the production cost.

Another objective of the present invention is to provide a dental restoration manufacturing method which is safer, more user-friendly and prevents or reduces the risk that the dental restorations produced are unusable or have an unacceptable, low quality.

These objectives are achieved through the independent claims of the present application. The subject-matters of the other dependent claims relate to further developments.

The dental restoration manufacturing method of the present invention comprises: a construction step of preparing through a construction means construction data for a dental tool machine for machining the dental restoration from a workpiece, wherein the construction data defines at least the geometry of the dental restoration within the workpiece; a starting step of starting machining of the dental restoration from the workpiece in accordance with the construction data; and a preparing step of starting preparing, before termination of the construction step, the dental tool machine at least through equipping it with all the consumables essential for starting the starting step, and completing preparing the dental tool machine before start of the starting step.

A major advantageous effect of the present invention is that the construction of the dental restoration and the equipping of the dental tool machine can be parallelized and performed in coordination, for instance, through a PC having a CAD/CAM software. Thereby, the production time and the production costs can be effectively reduced. Another major advantageous effect of the present invention is that it can be ensured that when starting the machining with the dental tool machine, all operating conditions are beforehand fulfilled in order to ensure an immediate start of the machining without the need of any operator interruptions. Thereby, the manufacturing of the dental restoration can be progressed in a seamless way.

According to an embodiment of the present invention, the essential consumables may comprise at least one of a dental tool, a workpiece, and a cooling lubricant provided in a tank. The cooling lubricant is not essential in case of dry machining. The dental tool machine may have one or more carriage units each for driving one or more dental tools for enabling parallel machining. The dental tools are mountable to the dental tool motors in the carriage units. The workpiece or preferably a multi-workpiece holder is attachable to a movable shaft in the dental tool machine. The tank storing the cooling lubricant is preferably exchangeably attachable to a cooling lubricant circulation unit of the dental tool machine.

According to an embodiment of the present invention, the dental manufacturing system preferably has a scanning means, for instance, an intraoral scanner which is preferably connected to a PC having a CAD/CAM software. In a scanning step, the patient is intraorally scanned through the scanning means for generating scanning data that can be used for determining the dental restoration to be constructed in the construction step. The construction means is also preferably configured through the PC having the CAD/CAM software that utilizes the scanning data. Alternatively, a dental imprint of the patient or the like can be extraorally scanned with an extraoral scanner.

According to an embodiment of the present invention, the preparing step is preferably started before starting of the construction step. Thereby, the construction of the dental restoration and the equipping of the dental machine can be parallelized unlike the prior art, to ensure a readiness state well before start of the machining.

According to an embodiment of the present invention, the preparing step may be even started before starting of the scanning step or simultaneously with the starting of the scanning step or before termination of the scanning step.

According to an embodiment of the present invention, the dental tool machine has a communication means that bidirectionally communicates with the PC in order to acquire, in the preparing step, information on all the essential consumables. Alternatively, the information may be manually input into the dental tool machine by the operator through the user-interface or another input means of the dental tool machine. The input means may be a USB port or the like. The user-interface preferably has a display. The display is preferably touch sensitive.

According to an embodiment of the present invention, the dental tool machine is preferably provided with an automatic equipping means which can acquire the information on all the essential consumables. And in the preparing step, the dental tool machine is automatically equipped through the automatic equipping means with one or more of the essential consumables in accordance with the acquired information on all the essential consumables.

According to an alternative embodiment of the present invention, the dental tool machine is preferably manually equipped in the preparing step with one or more of the essential consumables by the operator in accordance with the acquired information on all the essential consumables. The dental tool machine preferably provides guidance to the operator through the user interface when equipping the dental tool machine.

According to an embodiment of the present invention, the dental tool machine preferably has an identification means for determining in the preparing step whether the dental tool machine is correctly equipped with the essential consumables and ready for use in accordance with the acquired information on the essential consumables.

According to an embodiment of the present invention, the dental tools used in the manufacturing method of the present invention are preferably provided with miniaturized RFID tags respectively. The miniaturized RFID tag is preferably a read-only type. The miniaturized RFID tag preferably has a miniaturized air core coil. The miniaturized RFID tag stores dental tool specific information which specifically relates to the dental tool. The dental tool specific information includes at least a unique ID, e.g., a universal unique identifier (UUID) for unambiguously identifying the dental tool. The dental tool specific information preferably further includes information on at least one of the type, the manufacturer, the lot number, the length, and the concentricity of the dental tool. The identification means of the dental tool machine preferably has a transceiver unit for reading and/or writing the miniaturized RFID tags.

According to an embodiment of the present invention, the tank for storing the cooling lubricant used in the manufacturing method of the present invention is preferably provided with an RFID tag. The RFID tag is preferably a read-only type. The RFID tag preferably has an air core coil. The RFID tag stores cooling lubricant specific information which specifically relates to the cooling lubricant. The cooling lubricant specific information includes at least a unique ID, e.g., a universal unique identifier (UUID) for unambiguously identifying the cooling lubricant. The cooling lubricant specific information preferably further includes information on at least one of the type and the manufacturer of the cooling lubricant. The identification means of the dental tool machine preferably has a transceiver unit for reading and/or writing the RFID tag of the tank.

According to an alternative embodiment of the present invention, an optically readable medium may be used instead of the RFID tag or the miniaturized RFID tag. Accordingly, the identification means may be provided with optical readers for reading the optical media.

According to an embodiment of the present invention, the dental manufacturing system comprises preferably a determination means for determining, in a determination step, the remaining service life or use-time of one or more essential consumables used in the machining of the workpiece. The determination means is preferably configured through the PC having the CAD/CAM software for monitoring the operation of the dental tool machine.

According to alternative embodiments, the miniaturized RFID tag of the dental tool and/or the RFID tag of the tank are each preferably read & write type. In these alternative embodiments, the dental tool specific information preferably further includes the remaining service life of the dental tool or alternatively the use-time of the dental tool which can be both determined through the determination means of the dental tool machine and written through the transceiver unit into the miniaturized RFID tag on the dental tool.

In this alternative embodiment, the cooling lubricant specific information preferably further includes the remaining service life of the cooling lubricant or alternatively the use-time of the cooling lubricant which can be both determined through the determination means of the dental tool machine and written through the transceiver unit into the corresponding RFID tag on the tank.

According to an embodiment of the present invention, the workpieces used in the manufacturing method of the present invention are preferably provided with QR codes respectively. Bar codes or other optically readable media may be alternatively used. The QR code stores workpiece specific information which specifically relates to the workpiece. The workpiece specific information includes at least a unique ID, e.g., a universal unique identifier (UUID) for unambiguously identifying the workpiece. The workpiece specific information preferably further includes information on at least the type, the manufacturer, the material, the size, the shrinkage, the color of the workpiece. The identification means of the dental tool machine preferably has an optical unit such as a camera for reading the QR code or the like.

According to an embodiment of the present invention, the dental tool machine is preferably provided with a communication means for transmitting information to and/or receiving information from a data storage unit for at least storing the above-described dental tool specific information of one or more different dental tools and/or lubricant specific information of one or more different cooling lubricants in the tanks, and/or workpiece specific information of one or more different workpieces. The data storage unit may be internal to the dental tool machine, or external to the dental tool machine, for instance, in the PC or in the cloud, and accessible via a network, internet or the like.

According to an embodiment of the present invention, the dental tool machine preferably has a measuring means. The dental tool machine measures in the preparing step through the measuring means the essential consumables that it has been equipped with and/or whether it is calibrated. The calibration may be measured, for instance, through various touching operations by using sensors in which the workpiece is touched with the dental tool. The fill level of the cooling lubricant may be measured with a corresponding sensor.

According to an embodiment of the present invention, the dental tool machine preferably has a testing means. The dental tool machine tests in the preparing step through the testing means, whether one or more aggregates essential for starting the starting step are properly functioning and ready for use. Such aggregates include for instance the cooling lubricant circulation unit and the like.

The present invention also provides a computer-program comprising computer-executable codes for causing a computer-based dental manufacturing system to carry out the method steps of the present invention. The present invention also provides a computer-readable data storage which stores the computer-program.

The present invention also provides a computer-based dental manufacturing system having the above-mentioned functional units/parts for manufacturing a dental restoration. The computer-based dental manufacturing system executes the method steps of the present invention.

BRIEF DESCRIPTION OF THE DRAWINGS

In the subsequent description, further aspects and advantageous effects of the present invention will be described in more detail by using exemplary embodiments and by reference to the drawings, wherein FIG. 1a—is a workflow of manufacturing a dental restoration according to the prior art.

DETAILED DESCRIPTION OF THE INVENTION

Figures 1A, 1B:
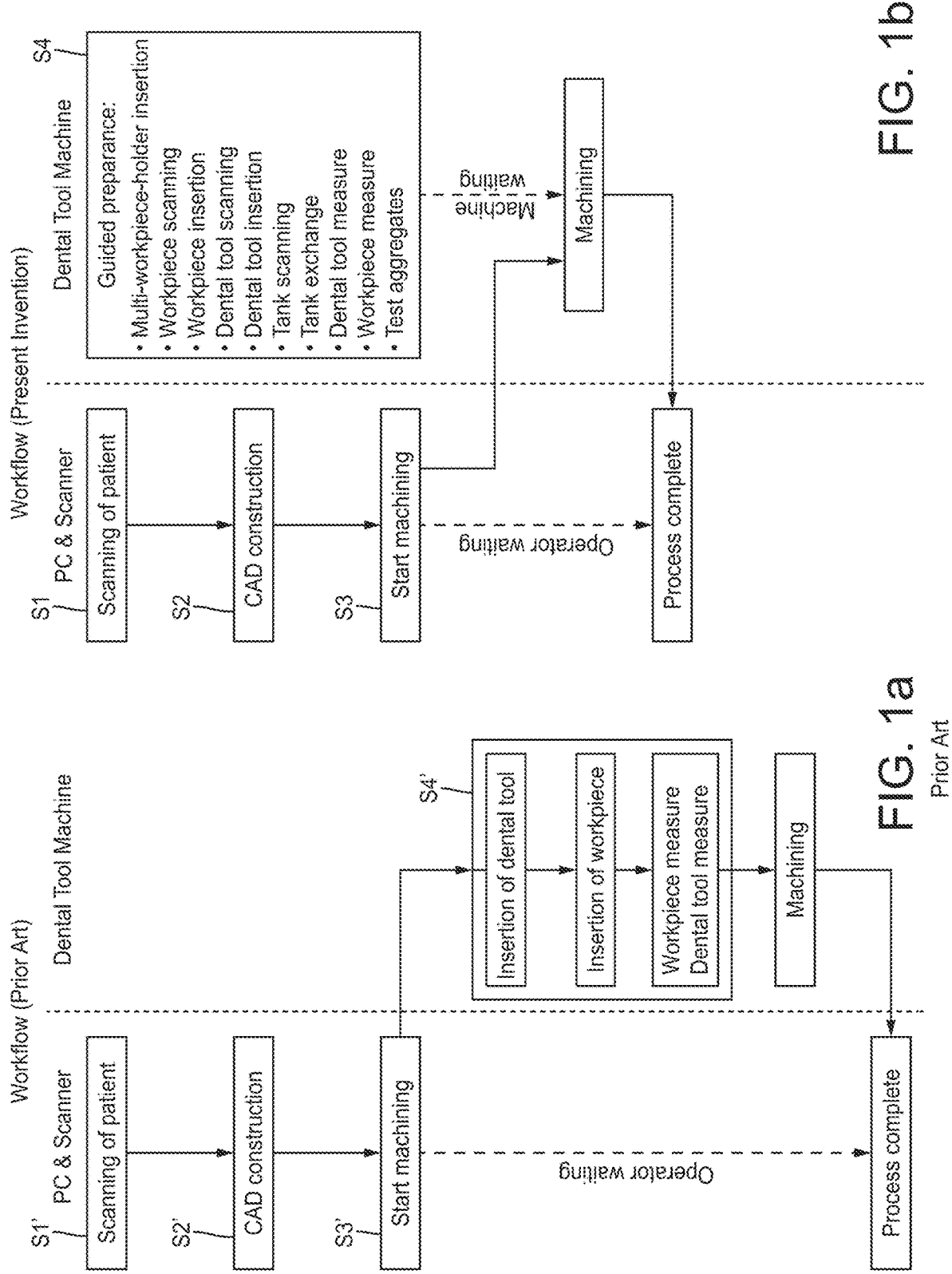
FIG. 1b—is a workflow of manufacturing a dental restoration according to an embodiment of the present invention.

The dental manufacturing system (not shown) of the present invention comprises a dental tool machine for machining a dental restoration from a workpiece, a scanning means such as an intraoral scanner, and a PC having a CAD/CAM software. Other functional means, parts, or units of the dental manufacturing system will be explained later. The dental manufacturing system is operated in accordance with the dental restoration manufacturing method of the present invention.

FIG. 1b partly illustrates the method of manufacturing a dental restoration according to an embodiment of the present invention. The method comprises a scanning step (S1) of intraorally scanning of a patient through the scanning means for generating scanning data for determining the dental restoration to be constructed; a construction step (S2) of preparing through a construction means, i.e., the PC, construction data for the dental tool machine for machining the dental restoration from the workpiece, wherein the construction data defines at least the geometry of the dental restoration within the workpiece; a starting step (S3) of starting machining of the dental restoration from the workpiece in accordance with the construction data; and a preparing step (S4) of starting preparing, before termination of the construction step (S2), the dental tool machine at least through equipping it with all the consumables essential for starting the starting step (S3), and completing preparing the dental tool machine before start of the starting step (S3).

The essential consumables comprise at least a dental tool, a workpiece, and a cooling lubricant provided in a tank. The dental tool can be inserted into a dental tool motor in a carriage unit of the dental tool machine. The workpiece or a multi-workpiece holder can be inserted into the shaft of the dental tool machine. The tank can be exchangeably mounted to the cooling lubricant circulation unit of the dental tool machine.

In an embodiment, the preparing step (S4) is started before starting of the construction step (S2). In other alternative embodiments, the preparing step (S4) is started before starting of the scanning step (S1) or simultaneously with the starting of the scanning step (S1) or before termination of the scanning step (S1).

In an embodiment, the dental tool machine has an automatic equipping means. The dental tool machine is automatically equipped in the preparing step (S4), with one or more of the essential consumables through the automatic equipping means.

In an alternative embodiment, the dental tool machine is manually equipped in the preparing step (S4), with one or more of the essential consumables by an operator with guidance of a user-interface of the dental tool machine.

In an embodiment, the dental tool machine has a communication means. The dental tool machine acquires in the preparing step (S4), information on all the essential consumables by communicating with another device, preferably the PC, through the communication means. Alternatively, in the preparing step (S4), the information on all the essential consumables are manually input by an operator through the user interface or another input means of the dental tool machine. The input means may be a USB port or the like.

In an embodiment, the dental tool machine has an identification means. The identification means includes a transceiver unit for reading & writing (hereinafter also shortly referred to as "scanning" in the FIG. 1b) the miniaturized RFID tag of a dental tool, another transceiver unit for reading & writing the RFID tag of a tank storing the cooling lubricant, and a camera for reading the QR code on a workpiece. The dental tool machine determines in the preparing step (S4) through the identification means, whether the dental tool machine is correctly equipped with the essential consumables and ready for use in accordance with the acquired information on all the essential consumables.

In an alternative embodiment, an optically readable medium may be used instead of the RFID tag or the miniaturized RFID tag. Accordingly, the identification means may be provided with optical readers, cameras or the like for reading the media.

In an embodiment, the dental manufacturing system has a determination means for determining the remaining service life or use-time of one or more essential consumables used in the machining of the workpiece. In a determining step, the remaining service life or use-time of one or more essential consumables used in the machining of the workpiece is determined through the determination means. The remaining service life or use-time of the dental tool may be written into the miniaturized RFID tag of the dental tool or in a separate data storage unit for retrieval. Similarly, the remaining service life or use-time of the cooling lubricant of the tank may be written into the RFID tag of the tank or in the separate data storage unit for retrieval. The data storage unit is preferably in the PC or in the dental tool machine or in an external location, for instance, in the medical practice, the cloud or the like.

In an embodiment, the dental tool machine has a measuring means for measuring the essential consumables it has been equipped with and/or whether it is calibrated. The dental tool machine measures, in the preparing step (S4), through the measuring means the essential consumables it has been equipped with and/or whether it is calibrated. The measurement means has one or more touch sensors. The measurement of the dental tool, the workpiece, and the calibration are conducted by touching the workpiece with the dental tool in various ways. The measuring means has a fill level sensor for measuring the fill level of the cooling lubricant in the tank.

In an embodiment, the dental tool machine has a testing means. The dental tool machine tests in the preparing step (S4) through the testing means, whether one or more aggregates essential for starting the starting step (S3) are present, properly functioning and ready for use. For instance, the workpiece, the multi-workpiece holder, the movable shaft of the multi-workpiece holder, the dental tool motors, the carriage units, the cooling lubricant circulation unit and the like are all tested.

The invention claimed is:

1. A method of manufacturing a dental restoration, the method comprising:
   preparing, in a construction step (S2), through a construction means construction data for a dental tool machine for machining the dental restoration from a workpiece, wherein the construction data defines at least the geometry of the dental restoration within the workpiece; and
   starting machining, in a starting step (S3), of the dental restoration from the workpiece in accordance with the construction data, and;
   starting preparing, in a preparing step (S4), before termination of the construction step (S2), the dental tool machine at least through equipping the dental tool machine with consumables, including a dental tool, the workpiece, and a cooling lubricant provided in a tank for starting the starting step (S3), and completing preparing the dental tool machine before start of the starting step (S3).

2. The method according to claim 1, wherein the preparing step (S4) is started before starting of the construction step (S2).

3. The method according to claim 1, wherein
   the dental tool machine is automatically equipped in the preparing step (S4), with one or more of the essential consumables through an automatic equipping means.

4. The method according to claim 1, wherein
   the dental tool machine is manually equipped in the preparing step (S4), with one or more of the essential consumables by an operator with guidance of a user-interface of the dental tool machine.

5. The method according to claim 1, wherein
   the dental tool machine acquires in the preparing step (S4) information on all the essential consumables by communicating with another device through a communication means or by manual input of an operator through a user interface or another input means of the dental tool machine.

6. The method according to claim 5, wherein the dental tool machine determines in the preparing step (S4) through an identification means, whether the dental tool machine is correctly equipped with the essential consumables and ready for use in accordance with the acquired information.

7. The method according to claim 6, wherein the dental tool machine measures in the preparing step (S4) through a measuring means the essential consumables it has been equipped with and/or whether it is calibrated.

8. The method according to claim 6, wherein the dental tool machine tests in the preparing step (S4) through a testing means, whether one or more aggregates essential for starting the starting step (S3) are properly functioning and ready for use.

9. The method according to claim 1, further comprising a step of determining through a determination means the remaining service life or use-time of one or more essential consumables used in the machining of the workpiece.

10. The method according to claim 1, further comprising:
    a scanning step (S1) of intraorally scanning of the patient or extraorally scanning a dental imprint of the patient through a scanning means for generating scanning data for determining the dental restoration to be constructed in the construction step (S2).

11. The method according to claim 10, wherein the preparing step (S4) is started before starting of the scanning step (S1) or simultaneously with the starting of the scanning step (S1) or before termination of the scanning step (S1).

12. A non-transitory computer-readable storage medium storing a program which, when executed by a computer system, causes the computer system to perform the method comprising:
    preparing, in a construction step (S2), through a construction means construction data for a dental tool machine for machining the dental restoration from a workpiece, wherein the construction data defines at least the geometry of the dental restoration within the workpiece; and
    starting machining, in a starting step (S3), of the dental restoration from the workpiece in accordance with the construction data, and
    starting preparing, in a preparing step (S4), before termination of the construction step (S2), the dental tool machine at least through equipping the dental tool machine with consumables, including a dental tool, the workpiece, and a cooling lubricant provided in a tank for starting the starting step (S3), and completing preparing the dental tool machine before start of the starting step (S3).

13. A computer-based dental manufacturing system for manufacturing a dental restoration, wherein the computer-based dental manufacturing system is adapted to perform the method comprising:
    preparing, in a construction step (S2), through a construction means construction data for a dental tool machine for machining the dental restoration from a workpiece, wherein the construction data defines at least the geometry of the dental restoration within the workpiece; and starting machining, in a starting step (S3), of the dental restoration from the workpiece in accordance with the construction data, and starting preparing, in a preparing step (S4), before termination of the construction step (S2), the dental tool machine at least through equipping the dental tool machine with consumables, including a dental tool, the workpiece, and a cooling lubricant provided in a tank for starting the starting step (S3), and completing preparing the dental tool machine before start of the starting step (S3).

\* \* \* \* \*